(12) United States Patent
Ionson

(10) Patent No.: US 8,856,057 B2
(45) Date of Patent: Oct. 7, 2014

(54) COGNITIVE SECURITY SYSTEM AND METHOD

(76) Inventor: James Albert Ionson, Lexington, MA (US)

(*) Notice: Subject to any disclaimer, the term of this patent is extended or adjusted under 35 U.S.C. 154(b) by 278 days.

(21) Appl. No.: 13/613,859

(22) Filed: Sep. 13, 2012

(65) Prior Publication Data

US 2014/0070947 A1     Mar. 13, 2014

(51) Int. Cl.
*G06F 17/00* (2006.01)
*G06F 5/00* (2006.01)
*G08B 31/00* (2006.01)
*G08B 13/00* (2006.01)

(52) U.S. Cl.
CPC ............. *G08B 13/00* (2013.01); *G06F 17/00* (2013.01); *G08B 31/00* (2013.01)
USPC ......................................................... 706/45

(58) Field of Classification Search
USPC ......................................................... 706/45
See application file for complete search history.

(56) References Cited

U.S. PATENT DOCUMENTS

| 7,958,043 | B2* | 6/2011 | Driscoll et al. | 705/37 |
| 7,979,368 | B2* | 7/2011 | Kapoor et al. | 706/20 |
| 8,010,469 | B2* | 8/2011 | Kapoor et al. | 706/20 |
| 8,135,657 | B2* | 3/2012 | Kapoor et al. | 706/45 |
| 8,402,540 | B2* | 3/2013 | Kapoor et al. | 726/23 |

* cited by examiner

*Primary Examiner* — Michael B Holmes

(57) ABSTRACT

A cognitive system and method for predicting and detecting security breaches is provided which yields cognitive inputs to a security management interface accessible by a human operator. The system utilizes symbolic cognitive architectures and inference processing algebras allowing the system to respond to open, incomplete, and/or unknown problem domains, offering flexibility in the case of unexpected changes in the security environment. The system is also capable of intelligently, and in real-time, adapting security peripheral configurations to further probe and analyze the real-time security environment, provided real-time data that can be processed with symbolic cognitive architectures and inference process algebras enabling the identification of new and emerging threat profiles leading to the prediction and detection of security breaches.

12 Claims, 3 Drawing Sheets

Cognitive Security System and Method

Traditional Security System

Passively Intelligent Security System

Cognitive Security System and Method

US 8,856,057 B2

COGNITIVE SECURITY SYSTEM AND METHOD

RELATED APPLICATIONS:

The present application is related to U.S. Pat. No. 7,944,468 B2, issued May 17, 2011, for AUTOMATED ASYMMETRIC THREAT DETECTION USING BACKWARD TRACKING AND BEHAVIORAL ANALYSIS, by Richard L. Hoffman, Joseph A. Taylor, included by reference herein.

The present application is related to U.S. Pat. No. 8,001,067 B2, issued Aug. 16, 2011, for METHOD FOR SUBSTITUTING AN ELECTRONIC EMULATION OF THE HUMAN BRAIN INTO AN APPLICATION TO REPLACE A HUMAN, by Thomas A. Visel, Vijay Divar, Lukas K. Womack, Matthew Fettig, Hene P. Hamilton, included by reference herein.

The present application is related to U.S. Pat. No. 7,932,923, issued Apr. 26, 2011, for VIDEO SURVEILLANCE SYSTEM EMPLOYING VIDEO PRIMITIVES, by Alan Lipton, Thomas Strat, Peter Venetianer, Mark Allmen, William Severson, Niels Haering, Andrew Chosak, Zhong Zhang, Tasuki Hirata, John Clark, included by reference herein.

The present application is related to U.S. Pat. No. 7,391,907, issued Jun. 24, 2008, for SPURIOUS OBJECT DETECTION IN A VIDEO SURVEILLANCE SYSTEM, by Peter Venetianer, Alan Lipton, Haiying Liu, Paul Brewer, John Clark, included by reference herein.

The present application is related to U.S. Pat. No. 7,884,849, issued Feb. 8, 2011, for VIDEO SURVEILLANCE SYSTEM WITH OMNI-DIRECTIONAL CAMERA, by Weihong Yin, Li Yu, Zhong Zhang, Andrew Chosak, Niels Haering, Alan Lipton, Paul Brewer, Peter Venetianer, included by reference herein.

The present application is related to U.S. Pat. No. 7,613,324, issued Nov. 3, 2009, for DETECTION OF CHANGE IN POSTURE IN VIDEO, by Peter Venetianer, Ndrew Chosak, Niels Haering, Alan Lipton, Zhong Zhang, Weihong Vin, included by reference herein.

The present application is related to U.S. Pat. No. 8,131,012, issued Mar. 6, 2012, for BEHAVIORAL RECOGNITION SYSTEM, by Eaton, et al., included by reference herein.

This application claims the benefit of U.S. Provisional Application No. 61/538,881, filed Sep. 25, 2011, which is incorporated herein by reference in its entirety for all purposes.

OTHER PUBLICATIONS

D. Canamero, "Modeling Motivations and Emotions as a Basis for Intelligent Behavior", Prd. First Int. Symp. on Autonomous Agents, AA, The ACM Press, 1997

A. R. Damasio, "Descartes' Error: Emotion, Reason and the Human Brain Robot", New York, USA: Picador, 1994

Eugene Eberbach, "$-Calculus of Bounded Rational Agents: Flexible Optimization as Search under Bounded Resources in Interactive Systems", Fundamentalnformaticae 68, 47-102, 2005

Eugene Eberbach, "$-Calculus Bounded Rationality=Process Algebra +Anytime Algorithms", Applicable Mathematics: Its Perspectives and Challenges, Narosa Publishing House, New Delhi, Mumbai, Calcutta, 532-539, 2001

Eygen Eberbach and Shashi Phoha, "SAMON: Communication, Cooperation and Learning of Mobile Autonomous Robotic Agents, Proc. of the 11th IEEE. Conf. on Tools with Artificial Intelligence ICTAI'99, Chicago, Ill., 229-236, 1999

Nils Goerke, "EMOBOT: A Robot Control Architecture Based on Emotion-Like Internal Values", Mobile Robots, Moving Intelligence (ed J. Buchli). ARS/pIV, Germany, 75-94, 2006

J. D. Velasquez, "When Robots Weep: Emotional Memories and Decision-Making", Proc. 15th National Conference on Artificial Intelligence, AAAI Press, Madison, Wis., USA, 1997

M. Salichs and M. Makfaz, "Using Emotions on Autonomous Agents. The Role of Happiness, Sadness and Fear.", Adaptation in Artificial and Biological Systems (AISB'06), Bristol, England, 157-164, 2006

John E. Laird, "The SOAR Cognitive Architecture", MIT Press, May 2012

Bradley J. Harnish, "Reactive Sensor Networks (RSN)", AFRL-IF-RS-2003-245 Technical Report, Penn State University sponsored by DARPA and AFRL, 2003

FIELD OF THE INVENTION

The present invention relates generally to the field of security systems for, but not limited to, all security, loss prevention and liability markets and applications and, more particularly, to a cognitive security system that automatically, and in real time, predicts and detects security breaches, simulating the cognitive behavior of humans.

BACKGROUND OF THE INVENTION

The most serious problem faced by today's security infrastructure is the inability to predict security breaches associated with adversary goals in real time and prevent these breaches from occurring, thereby eliminating unnecessary costs and further escalation of breaches. The problem is compounded by the fact that typical security environments are highly dynamic, especially in crowded settings where people and transportation vehicles are continuously, and in many cases, randomly changing the environment that must be secured. Furthermore, adversaries seldom work alone and deliberately attempt to change the security environment by introducing decoys and diversions to accomplish their goals.

Humans have evolved into highly sophisticated security systems. We instinctively know the goals of our adversaries, and the behaviors that they exhibit when attempting to execute their goals. We use all five senses to detect the signatures of these behaviors in order to assess the severity of the threat so that an effective, measured response can be initiated. Traditional security industry experts often defer to systems that prevent, detect/verify, and delay/divert adversaries from executing their goals. Numerous articles and presentations describe an unending list of technologies and techniques such as bollards, fences, buried and fence-mounted seismic, magnetic acoustical cables, infrared, visible and microwave imaging devices for safeguarding assets. The industry has created a security toolkit that is quite sophisticated, but relatively little emphasis has been placed on how these multiple tools can be used to build effective security systems that minimize false alerts, reduces costs and most important allows an appropriate measured response to be initiated before a breach even takes place. Although these technologies and techniques are necessary, they do not offer forward looking predictive capabilities. These technologies are most effective when used the way we use our own senses to detect and identify behavior patterns associated with the goals of an adversary. Real-time cognitive information is necessary to predict impending security breaches in order to minimize asset damage and trigger appropriate, measured responses to events, whether they turn out to be real threats or non-threatening situations that were triggered, often accidentally. Verified adversaries could be confronted or deterred before completing a mission or could be identified and apprehended before getting away. When non-threatening situations are identified, false alarms decrease, and unnecessary, costly and disruptive actions aren't taken.

Therefore, there is a need in the art of security for a cognitive security system that simulate how we, as humans, instinctively predict, detect, adapt and react to security breaches.

As shown in FIG. 1, traditional security systems have been highly dependent upon human operators to interpret data received by a security management interface from a variety of security peripherals such as cameras, access control systems, motion detectors, perimeter breach systems, tracking systems, biometric detection devices etc.. The operator is usually trained to understand the goals of potential adversaries for a variety of security environments such as critical infrastructure (pipelines, power plants fuel depots etc.), commercial, industrial and retail establishments, residences and entertainment facilities such as theme parks and cruise ships. In theory, these operators have an understanding of the threat profiles associated with the goals of a particular adversary. For example, threat profiles for terrorism, robbery, shop lifting, vandalism, insurance fraud, casino fraud, etc., are all quite different, and a highly skilled operator attempts to analyze raw data being generated by multiple security peripherals deployed through the security environment. The primary shortcoming of this approach is that even a highly trained operator finds it difficult if not impossible to process in real time the copious amounts of data coming from the security peripheral infrastructure. This makes it very difficult for the operator to predict, detect and prevent security breaches in real time. FIG. 2 illustrates advancements in deployed security systems that intelligently process data from multiple security peripherals in an attempt to detect well defined security events such as breaching a perimeter, breaching an access control system, loitering, peripheral tampering, anomalous object detection, object removal, etc.. For example, security peripherals such as cameras can be programmed to "memorize" a scene and detect changes to the scene such as the addition of an unknown object or the appearance of a potential intruder in a secured area, referred to as a "security event", which is communicated to human operators through a security management interface. The industry refers to this kind of capability as "intelligent" but in reality the intelligence is passive and not predictive or forward looking. Although these systems can detect various security events related to adversary threat profiles and help remove some of the burden from the operator regarding the interpretation of data being received from the security peripheral infrastructure, they do not offer enhanced cognitive inputs to the operator that help predict, detect, adapt and prevent security breaches in real time.

Other approaches to automatic threat detection have discussed the concept of asymmetric analysis using "backward tracking and behavioral analysis" (e.g., Automated Asymmetric Threat Detection using Backward Tracking and Behavioral Analysis as described by U.S. Pat. No. 7,944,468 B2 and Behavioral Recognition System as described by U.S. Pat. No. 8,131,012 which are incorporated herein by reference in their entirety). Some of these methods and systems are based upon a user defined "triggering event" which initiates looking backwards in time at the behavior of the entity that triggered the event. This analysis is done in real-time in an attempt to understand the past behavior of the triggering entity in order to provide an assessment of the threat status of the entity. Unfortunately the "triggering event" could very well be the security breach that the system is trying to prevent in the first place, placing these methods and systems into the category of post-event forensics rather than real-time prediction. Backward tracking methods and systems could provide inputs to a knowledge based security systems that could anticipate security breaches before they actually occur, but this would only be possible in the very rare case that the security environment and the aggressors' threat profiles were identical to those upon which the prior knowledge is based. This is, in fact, one of the critical drawbacks of knowledge-based security systems because if conditions exist that were not part of the training dataset for the knowledge based system, the results would be questionable, as would be no basis upon which to make such a decision by the knowledge based system. In addition, security environments are highly dynamic, and constantly changing, especially in venues that are crowded with people, vehicles and objects moving about and being re-positioned. Even in relatively uncluttered environments, multiple intruders entering the environment cause it to become non-linearly dynamic through techniques such as diversions and decoys to name a few. Other methods and systems utilize video streams to learn typical, normal behaviors within the environment and alert an operator if there is video activity that lies outside this norm. These techniques are not predictive and rely upon a human operator to decide if the video anomaly is a pre-cursor to a serious security breach. Therefore, none of the approaches to security that have been currently fielded or discussed have forward looking predictive capabilities in real life security environments.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In accordance with the present invention, there is provided a cognitive system for predicting and detecting security breaches in dynamic environments for, but not limited to, critical infrastructure, military, government, retail, entertainment, residential, commercial, industrial, loss prevention and liability markets comprising: A security state module that provides continuous, real-time security awareness to an adaptive reasoning module (described below) by collecting raw data from a variety of security peripherals and intelligently analyzing, fusing and processing this data to detect and identify a variety of high-level security events associated with an aggressors threat profile that are taking place within dynamic security environments. The adaptive reasoning module provides forward looking cognitive inputs to a security management interface, accessible by a human operator, that aids in predicting and reacting to prevent real time security breaches associated with adversary goals in dynamic security environments. The adaptive reasoning module uses data within its current context, learns from its experiences as it accumulates knowledge, explains itself and accepts direction, being aware of its own behavior and reflects on its own capabilities and responds in a robust manner to unexpected changes by utilizing symbolic cognitive architectures (e.g., "The SOAR Cognitive Architecture" which is incorporated herein by reference in its entirety) and inference process algebras such as, but not limited to $-calculus (pronounced: "cost calculus") (e.g., "$-Calculus of Bounded Rational Agents" which is incorporated herein by reference in its entirety).

Contained within the adaptive reasoning module there is a threat profile driver, for assessing the "emotional state" of the security system such as "happiness" when detected security events are non-threatening, "sadness" when non-threatening security events are not present and "fear" when the detection of new security events has increased (e.g., "Using Emotions on Autonomous Agents. The role of Happiness, Sadness and Fear" which is incorporated herein by reference in its entirety). The "emotional" state of the security system is strongly influenced by psychological internal values simulated by; for example, "suspicion" which is associated with an increase in unusual sensory inputs from the security state module and "curiosity" when there is a dramatic reduction in sensory data being supplied by the security state module. Outputs from the threat profile driver interact with a security peripheral configuration driver through symbolic cognitive architectures and inference process algebras such as, but not limited to, $-calculus, which intelligently, and in real-time, adapts security peripheral configurations to further probe and analyze the real-time security environment, resulting in real-time prediction of known threats as well as unforeseen threat profiles that could result in security breaches associated with adversary goals in dynamic security environments. These symbolic cognitive architectures and inference process algebras strive to minimize "suspicion" and maximize "curiosity" in a manner that drives the system to a relaxed emotional state characterized by reduced "fear" and "sadness" and enhanced "happiness" thereby providing a human operator with cognitive inputs from the adaptive reasoning module (through a security management interface) that aids in the real time prediction and detection of security breaches associated with adversary goals in dynamic security environments.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DESCRIPTION OF THE PREFERRED EMBODIMENT

To provide an overall understanding, certain illustrative embodiments will be described; however, it will be understood by one skilled in the art, inference process algebra and symbolic cognitive architecture mathematics that the system and method described can be adapted and modified to provide systems for other suitable applications and that additions and modifications can be made without departing from the scope of the system and method described herein.

Figure 1:
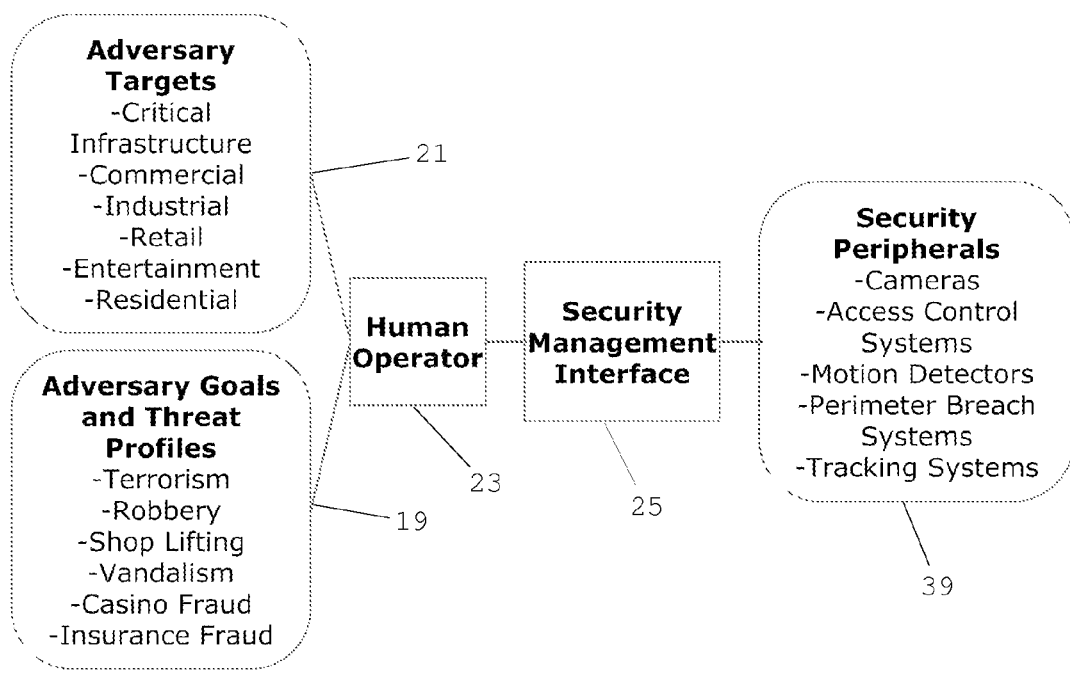
FIG. 1 is a basic block diagram describing typically deployed traditional security systems.
Figure 2:
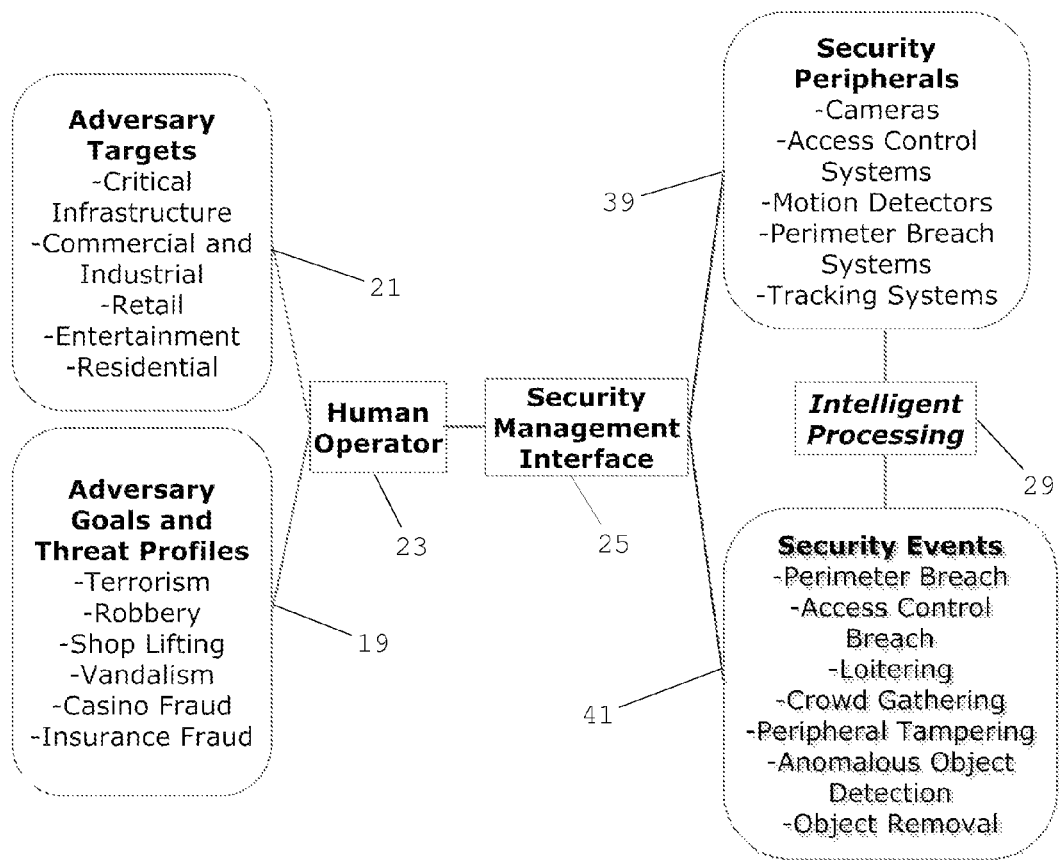
FIG. 2 is a block diagram that illustrates how passive intelligent processing of data from various security peripheral can help detect a variety of security events associated with the threat profiles of potential adversaries.

FIG. 1 and FIG. 2 represent prior art associated with typical security systems that are highly dependent upon the skill of a human operator 23 to predict and react to security breaches associated with adversary goals and threat profiles 19 directed against adversary targets 21 in a dynamic security environment 15.

Figure 3:
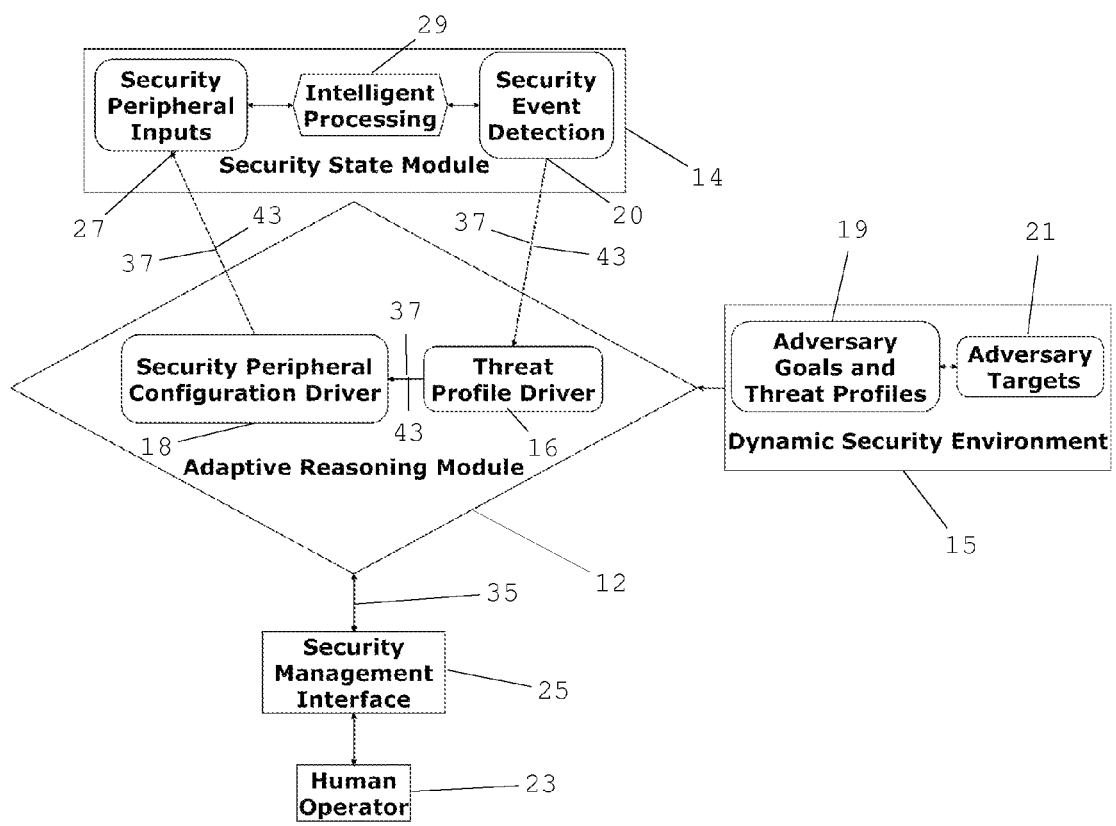
FIG. 3 is a block diagram of a cognitive security system that provides cognitive inputs to a human operator helping with the prediction and detection of security breaches associated with adversary goals in dynamic environments.

FIG. 3 is a block diagram of a cognitive security system for predicting and detecting real time security breaches in dynamic environments in accordance with an embodiment of the present invention. The primary function of this invention is to provide cognitive inputs 35 to a human operator 23 through a security management interface 25 regarding the security state of a dynamic security environment 15. These cognitive inputs 35 help the human operator 23 foresee security breaches before they occur so that appropriate measured responses can be initiated thereby preventing unnecessary costs and minimizing escalation of breaches. The dynamic security environment 15 within which this invention operates is subject to baseline adversary goals and threat profiles 19 directed against adversary targets 21 which often become more sophisticated as adversaries learn to take advantages of weakness within the dynamic security environment 15. The state of security within the dynamic security environment 15 is defined by processing data residing in a security state module 14, the data being acquired by multiple security peripherals 39 such as, but not limited to, security cameras, radar, motion, biometric, chemical and radioactive sensors etc., through a set of intelligent processing 29 techniques and algorithms that facilitate security event detection 20 associated with adversary goals and threat profiles 19. One component of this invention is an adaptive reasoning module 12 that utilizes symbolic cognitive architectures 43 and inference process algebras 37 such as, but not limited to, $-calculus which enables the adaptive reasoning module 12 to autonomously learn and adapt to conditions associated with the dynamic security environment 15. These symbolic cognitive architectures 43 and inference process algebras 37 enable the adaptive reasoning module 12 to infer intentions/activities of aggressors through the detection of their actions (i.e., security event detection 20). Such algebras and architectures have built-in cost optimization mechanisms allowing them to deal with nondeterminism, incomplete and uncertain information. In particular, $-calculus is a higher-order polyadic process algebra with a "cost" utility function, such as probability of security event detection 20, that integrates deliberate and reactive approaches for action in real time enabling metareasoning in distributed interactive systems. These algebras have been successfully applied to the Office of Naval research SAMON robotics testbed to derive GBML (Generic Behavior Message-passing Language) for behavior planning, control and communication of heterogeneous Autonomous Underwater Vehicles (AUV's) (e.g., SAMON: Communication, Cooperation and Learning of Mobile Autonomous Robotic Agents which is incorporated herein by reference in its entirety). In addition, $-calculus has also been used in the DARPA Reactive Sensor Networks Project at ARL Penn. State university for empirical cost profiling (e.g., "Reactive Sensor Networks (RSN)" which is incorporated herein by reference in its entirety). In general these algebras are applicable to robotics, software agents, neural nets, and evolutionary computing. $-calculus expresses all variables as cost expressions: the environment, multiple communication/interaction links, inference engines, modified structures, data, code and meta-code. One of the cost functions used in this invention might be "uncertainty" within the threat profile driver 16 which operates using an internal values system that is not only dependent on physical conditions of the real-time security environment but in addition depends upon metastates of the environment associated with unforeseen changes and/or conditions that lie outside the baseline adversary goals and threat profiles 19 of known adversaries. These internal values are designed in accordance with psychological terms that we (human beings) associate with "drives" and "emotions". These internal values do not actually realize real "drives" and "emotions", but the threat profile driver 16 is designed in such a way that it exhibits behavior that is governed by "drives" and "emotions". The threat profile driver 16 imitates emotionally driven behavior, much as we (human beings) do and responds to dynamic changes in the security state just as we might. Specifically, the "emotional" state of the security system is strongly influenced by psychological internal values simulated by, for example, "suspicion" which is associated with an increase in unusual or atypical sensory inputs from the security state module 14 and "curiosity" when there are dramatic fluctuations in sensory data being supplied by the security state module 14. These internal values, among others, are used to help define the "emotional state" of the security system with "fear" being associated with a rise in "suspicion" and "happiness" being associated with a rise in "curiosity" through symbolic cognitive architectures 43 and inference process algebras 37 and autonomously updates in real time the adaptive reasoning module 12 with new and/or emerging adversary goals and threat profiles 19 that could characterize new and/or unforeseen security breaches associated with adversary targets 21 in dynamic security environment 15. The threat profile driver 16 interacts with the security peripheral configuration driver 18 through symbolic cognitive architectures 43 and inference process algebras 37 and drives, in real-time, modifications to security peripheral configurations to further probe and analyze the real-time dynamic security environment 15 in an attempt to enhance the "emotional well being" of the security system. Security peripheral inputs 27, security event detection 20, the threat profile driver 16 and the security peripheral configuration driver 18 are interactively coupled within the adaptive reasoning module 12 through symbolic cognitive architectures 43 and inference process algebras 37 which minimizes cost expressions such as "uncertainty", "suspicion" and/or "fear" in a manner that simulates the cognitive processing abilities of a human being, given the same conditions. This cognitive security system results in cognitive inputs 35 to a security management interface 25 that aids a human operator 23 in predicting, adapting and reacting to security breaches associated with adversary targets 21 in a dynamic security environment 15.

A simple example is provided that relates to fraudulent "card counting" by professional blackjack players in the casino market. Casino surveillance directors are well aware of the threat profile associated with blackjack card counters who utilize statistical card counting techniques to maximize their winnings at a blackjack table. When a card counter is identified they lose their casino privileges and are asked not to return. The basic threat profile of a card counter is as follows. They enter the casino during times when there is a great deal of activity around slot machines and other table games. Their behavior is quite deliberate and they do not wander or linger as do the majority of other customers. They make their way directly to an empty blackjack table that is only using two decks of cards. They usually leave the table if someone else joins in the game. The variation in their wagers is abnormally large and is correlated with the statistics of prior hands that have been played. This profile is quite easy to detect which is why card counters have begun to alter their profile, but with the same card counting goal in mind. Referring to FIG. 3, the security peripheral inputs 27 for this example might come from a suite of fixed and PTZ (Pan-Tilt-Zoom) cameras that provide persistent visual awareness data on the casino floor as well as more detailed video of the cards being dealt at the blackjack tables, including payouts and losses of the players. Security event detection 20 such as wins and losses is accomplished through intelligent processing 29 of the raw video data which also results in a stored database of hands played, cards dealt, and wagers associated with the wins and losses. This database is continuously updated within the security state module 14 which in turn is interacting with the adaptive reasoning module 12 through symbolic cognitive architectures 43 and inference process algebras 37. In this example the adaptive reasoning module 12 might use "probability" as its cost function in order to build a ranked set of hypotheses for prediction and interpolation. Specifically, the threat profile driver 16 uses data from the security state module 14 to look for probable "correlations" that suggest "suspicious" behavior patterns at the blackjack table. For example, the security state module 14 might detect two or more players at a blackjack table which, according to the typical threat profile of a card counter, should not be cause for alarm. However, the symbolic cognitive architectures 43 and inference process algebras 37 drive the system to be "curious", looking for unusual correlations such as the behavior of a team of card counters at the same table. In this case, the playing strategy of the team is correlated in a manner that is not typical for normal recreational players. Recreational players strive to "win", but a team of card counters have an opposite behavior with one player deliberately losing a hand with a small wager in order to optimize the chances of the other member wining with a significantly higher wager. As the threat profile driver 16 detects these correlations it "learns" the new threat profile for a team of card counters and also communicates to the security peripheral configuration driver 18 to reconfigure the security cameras to provide more details on the specifics of each players playing pattern so the security state module 14 can be further upgraded. This interactive communication between the security state module 14 and adaptive reasoning module 12 continues until processing by the symbolic cognitive architectures 43 and inference process algebras 37 achieves a human operator 23 defined threshold probability that a security breach related to card counting is about to take place or is in progress. This represents the cognitive inputs 35 provided to the security management interface 25 helping the human operator 23 to take action and prevent the security breach from taking place, in this case related to card counting.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A cognitive security system for predicting and detecting security breaches, comprising:
   means for executing cognitive analysis of data representing the current state of security, learning from experiences as data and knowledge are accumulated, accepting direction, being aware of its own behavior, responding to unexpected changes in security environments, and combinations thereof; utilizing techniques that simulate the cognitive processing abilities of the human brain;

means for providing security awareness to the system by collecting data from security peripheral configurations comprising at least one security data collection device and analyzing, fusing, processing, and combinations thereof the data to detect and identify events associated with threat profiles characteristic of security breaches; and means for managing, sorting, organizing, prioritizing and combinations thereof the results of cognitive analysis of data; helping human operators manage and interpret the results of the cognitive analysis of data comprising visualization of the security state, threat assessment information, alerts, and combinations thereof.

2. The cognitive security system in accordance with claim 1, wherein said means for executing cognitive analysis of data representing the current state of security, learning from experiences as data and knowledge are accumulated, accepting direction, being aware of its own behavior, responding to unexpected changes in security environments, and combinations thereof; utilizing techniques that simulate the cognitive processing abilities of the human brain that aid in predicting and detecting security breaches comprises a software, firmware, hardware and combinations thereof adaptive reasoning module.

3. The cognitive security system in accordance with claim 1, wherein said means for providing security awareness to the system by collecting data from security peripheral configurations comprising at least one security data collection device and analyzing, fusing, processing, and combinations thereof the data to detect and identify events associated with threat profiles characteristic of security breaches comprises a software, firmware, hardware and combinations thereof security state module.

4. The cognitive security system in accordance with claim 1, wherein said means for managing, sorting, organizing, prioritizing and combinations thereof the results of cognitive analysis of data; helping human operators manage and interpret the results of the cognitive analysis of data comprising visualization of the security state, threat assessment information, alerts, and combinations thereof comprises a software, firmware, hardware and combinations thereof security management interface.

5. A cognitive security system for predicting and detecting security breaches, comprising:

a software, firmware, hardware and combinations thereof adaptive reasoning module, for executing cognitive analysis of data representing the current state of security, learning from experiences as data and knowledge are accumulated, accepting direction, being aware of its own behavior, responding to unexpected changes in security environments, and combinations thereof; utilizing techniques that simulate the cognitive processing abilities of the human brain;

a software, firmware, hardware and combinations thereof security state module, for providing security awareness to the system by collecting data from security peripheral configurations comprising at least one security data collection device and analyzing, fusing, processing, and combinations thereof the data to detect and identify events associated with threat profiles characteristic of security breaches; and a software, firmware, hardware and combinations thereof security management interface, for managing, sorting, organizing, prioritizing and combinations thereof the results of cognitive analysis of data; helping human operators manage and interpret the results of the cognitive analysis of data comprising visualization of the security state, threat assessment information, alerts, and combinations thereof.

6. The cognitive security system as recited in claim 5, further comprising:

a set of inference process algebras, for processing data generated by the system in a manner that simulates the cognitive processing abilities of the human brain.

7. The cognitive security system as recited in claim 5, further comprising:

a set of symbolic cognitive architectures, for processing data generated by the system in a manner that simulates the cognitive processing abilities of the human brain.

8. The cognitive security system as recited in claim 5, further comprising:

a software, firmware, hardware and combinations thereof threat profile driver, for driving cognitive processing of security event data obtained by security peripheral configurations comprising at least one security data collection device and correlating the data with a database of security events comprising at least one threat profile, and continuously updating the database with at least one new security event associated with at least one new threat profile.

9. The cognitive security system as recited in claim 5, further comprising:

a software, firmware, hardware and combinations thereof security peripheral configuration driver, for driving software, firmware, hardware and combinations thereof modifications of security peripheral configurations comprising at least one security data collection device in response to at least one new threat profile, security event and combinations thereof that could be characteristic of new and unforeseen security breaches.

10. A cognitive security system for predicting and detecting security breaches, comprising:

a software, firmware, hardware and combinations thereof adaptive reasoning module, for executing cognitive analysis of data representing the current state of security, learning from experiences as data and knowledge are accumulated, accepting direction, being aware of its own behavior, responding to unexpected changes in security environments, and combinations thereof; utilizing techniques that simulate the cognitive processing abilities of the human brain that aid in predicting and detecting security breaches;

a software, firmware, hardware and combinations thereof security state module, for providing security awareness to the system by collecting data from security peripheral configurations comprising at least one security data collection device and analyzing, fusing, processing, and combinations thereof the data to detect and identify events associated with threat profiles characteristic of security breaches;

a software, firmware, hardware and combinations thereof security management interface, for managing, sorting, organizing, prioritizing and combinations thereof the results of cognitive analysis of data; helping human operators manage and interpret the results of the cognitive analysis of data comprising visualization of the security state, threat assessment information, alerts, and combinations thereof;

a set of inference process algebras, for processing data generated by the system in a manner that simulates the cognitive processing abilities of the human brain;

a set of symbolic cognitive architectures, for processing data generated by the system in a manner that simulates the cognitive processing abilities of the human brain;

a software, firmware, hardware and combinations thereof threat profile driver, for driving cognitive processing of security event data obtained by security peripheral configurations comprising at least one security data collection device and correlating the data with a database of security events comprising at least one threat profile, and continuously updating the database with at least one new security event associated with at least one new threat profile; and a software, firmware, hardware and combinations thereof security peripheral configuration driver, for driving software, firmware, hardware and combinations thereof modifications of security peripheral configurations comprising at least one security data collection device in response to at least one new threat profile, security event and combinations thereof that could be characteristic of new and unforeseen security breaches.

11. A method for predicting and detecting security breaches comprising the step of: utilizing security peripheral configurations comprising at least one security data collection device; and utilizing software, firmware, hardware and combinations thereof processing devices to further process the collected data utilizing cognitive processing techniques that simulate the processing abilities of the human brain to identify events associated with threat profiles characteristic of security breaches.

12. The method of claim 11 wherein the step of utilizing security peripheral configurations comprising at least one security data collection device comprises the steps of: utilizing processed data to drive modifications to security peripheral configurations to collect additional data to be processed with cognitive processing techniques that simulate the cognitive abilities of the human brain to further define the current state of security resulting in the prediction and detection of security breaches.

* * * * *